United States Patent
Schenone

(10) Patent No.: US 11,713,185 B2
(45) Date of Patent: Aug. 1, 2023

(54) METHOD FOR PRODUCING A CUP FOR A CAPSULE FOR INFUSED OR SOLUBLE BEVERAGES, AND RELATED CUP AND CAPSULE

(71) Applicant: Bisio Progetti S.p.A., Alessandria (IT)

(72) Inventor: Matteo Schenone, Alessandria (IT)

(73) Assignee: BISIO PROGETTI S.P.A., Alessandria (IT)

( * ) Notice: Subject to any disclaimer, the term of this patent is extended or adjusted under 35 U.S.C. 154(b) by 545 days.

(21) Appl. No.: 16/650,435

(22) PCT Filed: Sep. 10, 2018

(86) PCT No.: PCT/IB2018/056869
§ 371 (c)(1),
(2) Date: Mar. 25, 2020

(87) PCT Pub. No.: WO2019/064096
PCT Pub. Date: Apr. 4, 2019

(65) Prior Publication Data
US 2020/0223623 A1   Jul. 16, 2020

(30) Foreign Application Priority Data

Sep. 28, 2017  (IT) .................. 102017000108896

(51) Int. Cl.
| | | |
|---|---|---|
| *B65D 85/804* | (2006.01) | |
| *B29C 45/00* | (2006.01) | |
| *B29C 45/16* | (2006.01) | |
| *B65D 1/28* | (2006.01) | |
| *B65D 65/40* | (2006.01) | |
| *B29L 31/00* | (2006.01) | |

(52) U.S. Cl.
CPC ...... *B65D 85/8043* (2013.01); *B29C 45/0053* (2013.01); *B29C 45/16* (2013.01); *B65D 1/28* (2013.01); *B65D 65/40* (2013.01); *B29L 2031/7132* (2013.01)

(58) Field of Classification Search
CPC ...... B65D 1/28; B65D 65/40; B65D 85/8043; B29L 2031/7132; B29C 45/0053; B29C 45/16
USPC ......... 264/328.8, 328.1, 138, 153, 154, 155, 264/156
See application file for complete search history.

(56) References Cited

FOREIGN PATENT DOCUMENTS

| | | |
|---|---|---|
| WO | 2013029184 A1 | 3/2013 |
| WO | 2013136210 A1 | 9/2013 |
| WO | 2014053638 A1 | 4/2014 |
| WO | 2016193961 A2 | 12/2016 |
| WO | WO-2017103952 A1 * | 6/2017 ........... B65B 29/022 |

OTHER PUBLICATIONS

International Search Report and Written Opinion for International Patent Application No. PCT/IB2018/056869, dated Nov. 20, 2018. 9 pages.

\* cited by examiner

*Primary Examiner* — Philip C Tucker
*Assistant Examiner* — Jimmy R Smith, Jr.
(74) *Attorney, Agent, or Firm* — Armstrong Teasdale LLP

(57) ABSTRACT

A method for producing a cup for a capsule for the preparation of infused or soluble beverages is provided. The method includes the steps of co-injection molding a cup of multilayer plastic material with an intermediate layer of the gas barrier type, the cup being a single body provided with a bottom having a nozzle, and an inner base including a completely closed central portion covering the nozzle, partially cutting the central portion to form at least one opening connecting the inside of the cup and the nozzle, and a further step of folding a portion of the cup between the opening and the nozzle towards the inside of the nozzle to form a deflector.

5 Claims, 8 Drawing Sheets

METHOD FOR PRODUCING A CUP FOR A CAPSULE FOR INFUSED OR SOLUBLE BEVERAGES, AND RELATED CUP AND CAPSULE

CROSS-REFERENCE TO RELATED APPLICATIONS

This application is a National Stage Application of International Patent Application No. PCT/IB2018/056869, having an International Filing Date of Sep. 10, 2018, which claims the benefit of priority to Italian Patent Application No. 102017000108896, filed Sep. 28, 2017, the entire contents of which are hereby incorporated by reference herein.

FIELD OF THE INVENTION

The object of the present invention is a method of producing a cup out of plastic material for the production of a capsule for the preparation of infused or soluble beverages. The object of the present invention is also the same cup and the capsule obtained by means of said cup, usable for the packaging of concentrated products (for example in the form of powder, granules, leaves) in predetermined and single-use doses for the impromptu preparation of beverages (such as tea, coffee, herbal teas, milk, chocolate, etc.) by introducing a fluid under pressure (usually hot water) into the same capsule.

BACKGROUND OF THE INVENTION

In the sector of capsules or pods for coffee or other infusions, it is well known to use "self-protected" or "barriered" capsules, i.e. able to guarantee the protection of the organoleptic characteristics of the food substance contained therein, while protecting it from external agents such as gas, etc., without the need to be wrapped in a protective wrapping (such as an aluminum pouch).

In the sector it is therefore known to make capsules using cups (i.e. the body of the capsule within which the food substance to be infused or dissolved is contained) obtained by injection molding of polymeric material such as polybutylene terephthalate (PBT), known for providing high hermetic sealing so as not to disperse the aroma of the mixture, as well as to achieve an effective barrier to oxygen and moisture and ensure the product has a long shelf life. However, some studies seem to have uncovered some disadvantages linked to the use of this material related to the risk of toxic substances being released in contact with boiling water.

In the sector it is therefore known to make capsules using cups obtained by thermoforming in multilayer material with an internal barrier layer, for example made of Ethylene vinyl alcohol (EVOH), which protects the food substance from air, light and humidity. However, such production technique also has some disadvantages related to an inconsistent and non-uniform distribution of plastic material in the sinuosity of the mold, which prevents the formation of articulated and complex geometries.

SUMMARY OF THE INVENTION

The object of the present invention is to provide a production method of a cup for the production of a capsule for the preparation of infused or soluble beverages that resolves the drawbacks of the prior art while taking into account the needs of the sector.

In particular, the object of the present invention is to provide a method for the production of a cup for making capsules which is barriered and at the same time safe to one's health and which allows the complex and articulated geometries necessary for an optimal dispensing of the beverage to be obtained.

Such object is achieved by the production method the cup and the capsule having the features described below. Preferred embodiments of the invention are also described.

BRIEF DESCRIPTION OF THE DRAWINGS

The features and advantages of the method and the cup according to the present invention will be apparent from the description given below, provided by way of non-limiting example, in accordance with the accompanying figures, wherein.

DETAILED DESCRIPTION

With reference to the accompanying figures, a cup adapted to define an inner volume V for the containment of at least one substance to be infused or dissolved, typically in powder or granular form, is indicated at reference number 2.

Said cup 2 is usable for the production of a capsule for the preparation of infused or soluble beverages, indicated at reference number 1.

The cup 2 is made of plastic material, by means of co-injection molding, i.e. several layers of different materials are injected into the mold cavity at the same time, which fill the cavity, thus creating a multilayer wall.

In particular, the cup 2 has a multilayer wall, with an outer layer, an inner layer intended to come into contact with the food chamber, and a barrier-type intermediate layer.

Advantageously, the intermediate layer creates a barrier to gases, in particular, oxygen. Preferably, the intermediate layer is made of ethylene vinyl alcohol (EVOH) or polyvinyl alcohol (PVOH).

Preferably, both the outer and inner layers are made of polypropylene (PP), or polyethylene (PE), or polylactic acid (PLA).

In one example of embodiment (PP-EVOH-PP), the cup 2 is multilayer composed of an outer layer made of polypropylene, an intermediate barrier layer made of ethylene vinyl alcohol, and an inner layer made of polypropylene.

In a different example of embodiment (PE-EVOH-PE) the cup 2 is multilayer composed of an outer layer made of polyethylene, an intermediate barrier layer made of ethylene vinyl alcohol, and an inner layer made of polyethylene.

Preferably therefore, the material making the inner layer and the outer layer is a non-barrier material, belonging to the family of polyolefins, of the inert and food-compatible type.

In a further example of embodiment, the cup 2 is biodegradable and compostable. In such example of embodiment (PLA-PVOH-PLA), the cup 2 is multilayer composed of an outer layer made of polylactic acid, an intermediate barrier layer made of polyvinyl alcohol, and an inner layer made of polylactic acid.

Preferably, the distribution of the thicknesses of the layers in the multilayer that forms the cup 2 is of the type: outer layer about 45%, intermediate layer about 10%, inner layer about 45%.

Figure 1:
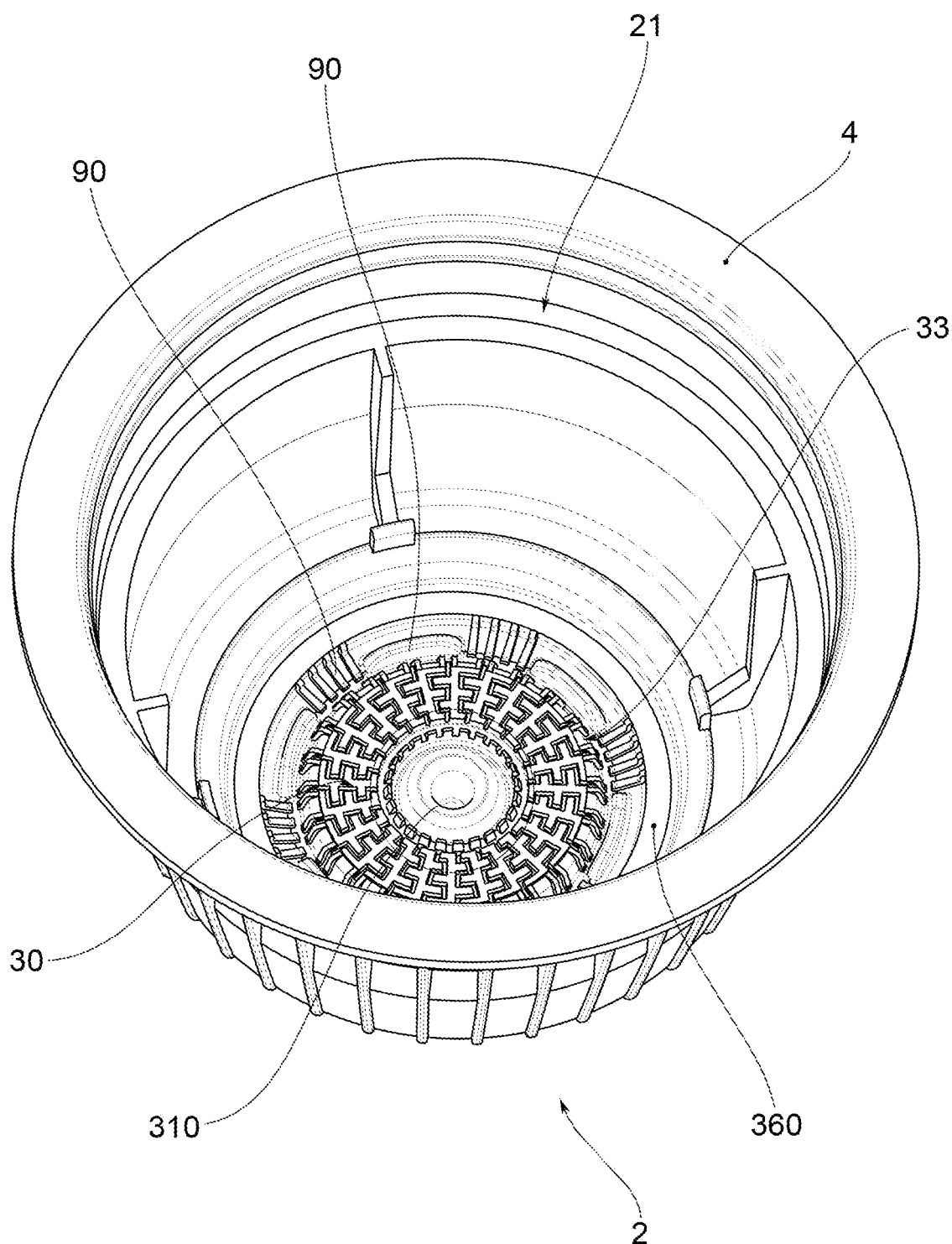
FIG. 1 shows a perspective view from above of a cup according to the present invention, usable as the body for a capsule for the preparation of soluble or infused beverages, in a first stage of production.
Figure 2:
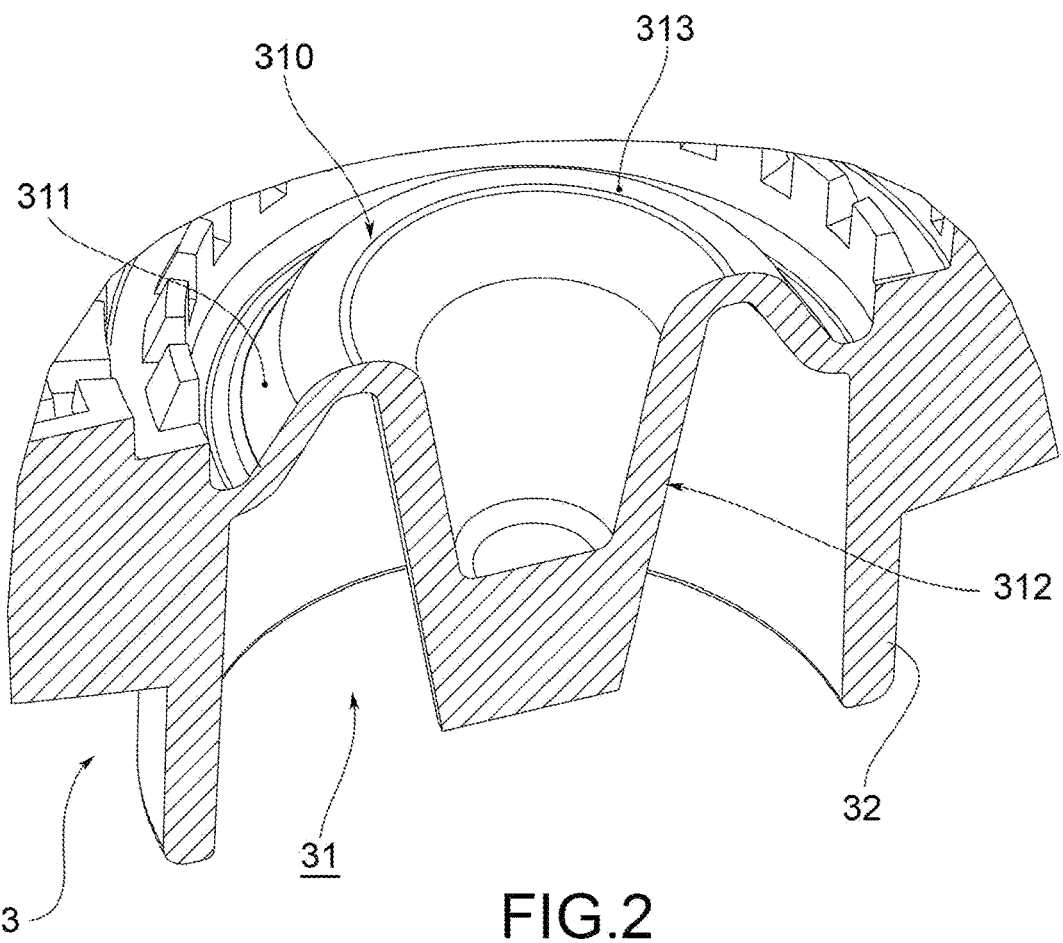
FIGS. 2 and 3 show a detail of the cup in FIG. 1, in particular an inner separation wall with the outlet nozzle in a first stage of production, i.e. completely closed.
Figure 3:
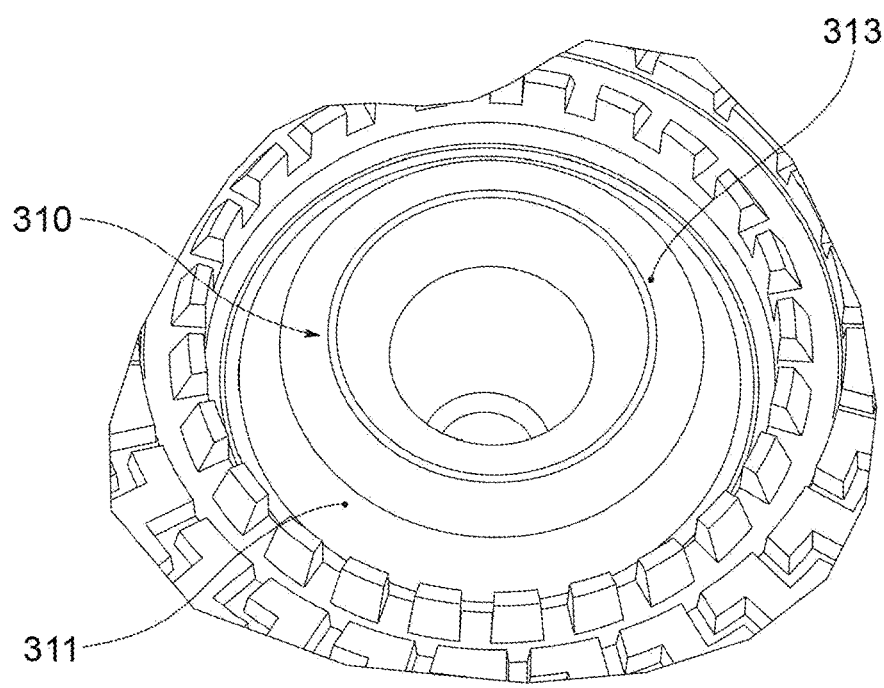
Figure 4:
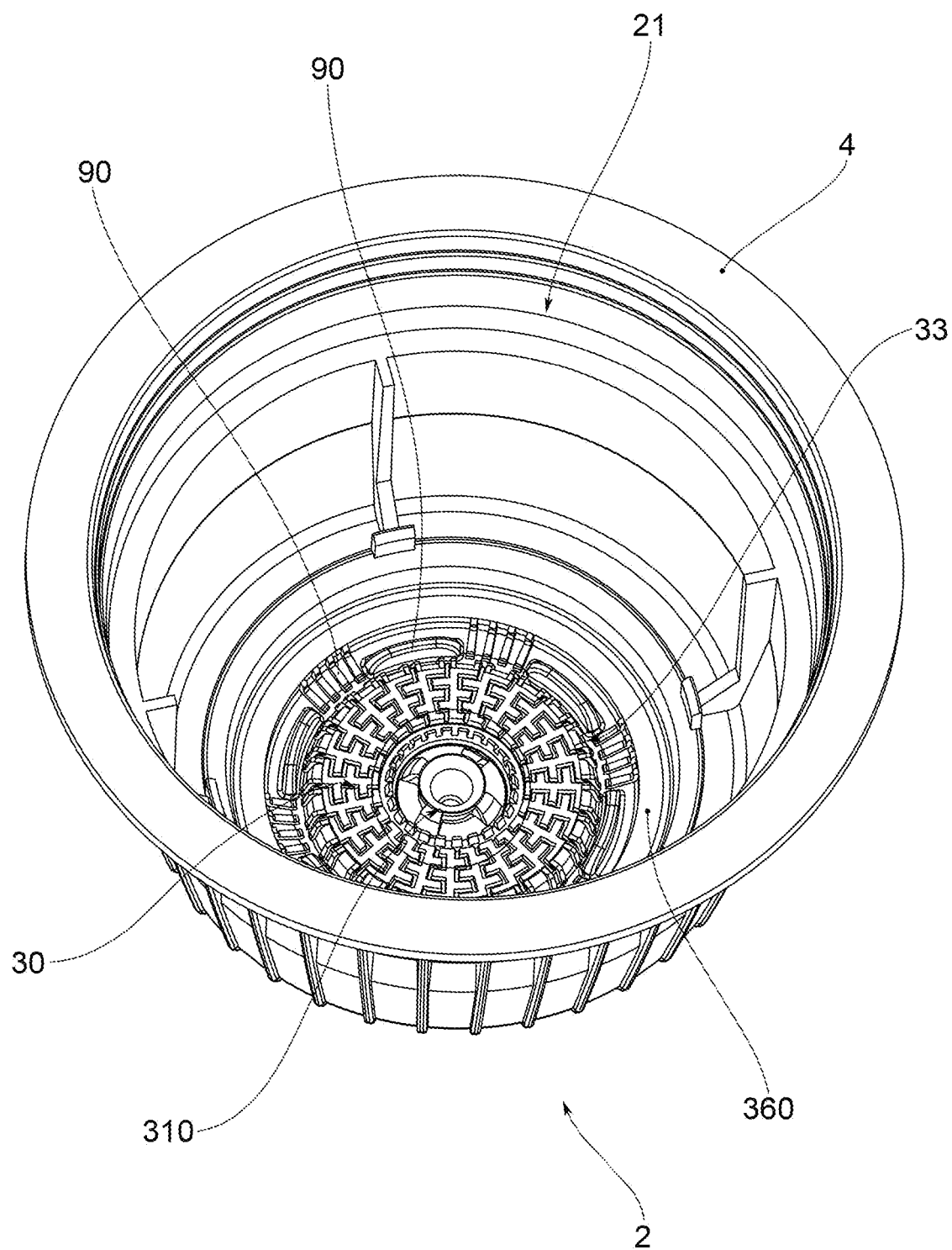
FIG. 4 shows a perspective view from the top of the cup in FIG. 1 at a later stage of production.

As shown in FIGS. 1 and 4, the cup 2 is provided, on the one side, with a bottom 3 and, on the opposite side, with an inlet opening 21 defined by an edge 4 protruding outward.

The cup 2 is provided externally at the bottom 3 with an outlet opening 31, defined by a nozzle 32, adapted to allow the infused beverage to escape.

The cup 2 is provided internally with an inner base 33 at the bottom 3.

Said base 33 is provided with a plurality of protuberances 310, 320, 360 projecting vertically with respect to the same base 33, toward the inside of the cup 2.

Advantageously, the top surface of the protuberances 310, 320, 360 is substantially flat and devoid of cutting, puncture or tearing elements.

The base 33 comprises a central portion 310 to cover the outlet opening 31 of the nozzle 32.

As mentioned above, the cup 2 is made by means of co-injection molding, a technique that allows a barrier material (e.g. EVOH) to be embedded between external layers suitable for contact with the food chamber (e.g. PP and/or PE), thus obtaining a cup 2 that is barriered and is at the same time safe to one's health. The technique of co-injection molding, while allowing complex and articulated geometries to be obtained, does not allow openings to be made in the wall directly during the molding step.

The production method of the cup 2 provides therefore for an initial co-injection molding step of a single body, without interruptions or openings in the wall.

FIG. 1 shows the cup 2 in a first stage of production, i.e. as extracted from the mold. As may be seen from FIGS. 2, 3, 11 and 13, the cup 2 has a completely closed central portion 310. The central portion 310 is a continuous wall, which completely closes the opening 31.

Preferably, the central portion 310 comprises an external circular crown 311, which connects with the rest of the inner base 33, a flat portion 313, which forms an abutment for the attachment of a sealing disk 5, and a central pin 312, which extends inside the opening 31 and nozzle 32.

FIG. 4 shows the cup 2 at a subsequent stage of production. As is seen from FIGS. 5, 6, 12 and 14, the cup 2 has the central portion 310 equipped with openings for the outflow of the beverage.

The production method of the cup 2 thus provides for a subsequent shearing (or cutting, or perforation) of the central portion 310 to make openings 314 in said central portion 310, in particular in the outer circular crown 311.

Following the shearing step, the central portion 310 has a plurality of connection openings 314 between the inside of the cup 2 and the outlet opening 3, to allow the flow of the infused beverage out of the capsule 1.

Figure 5:
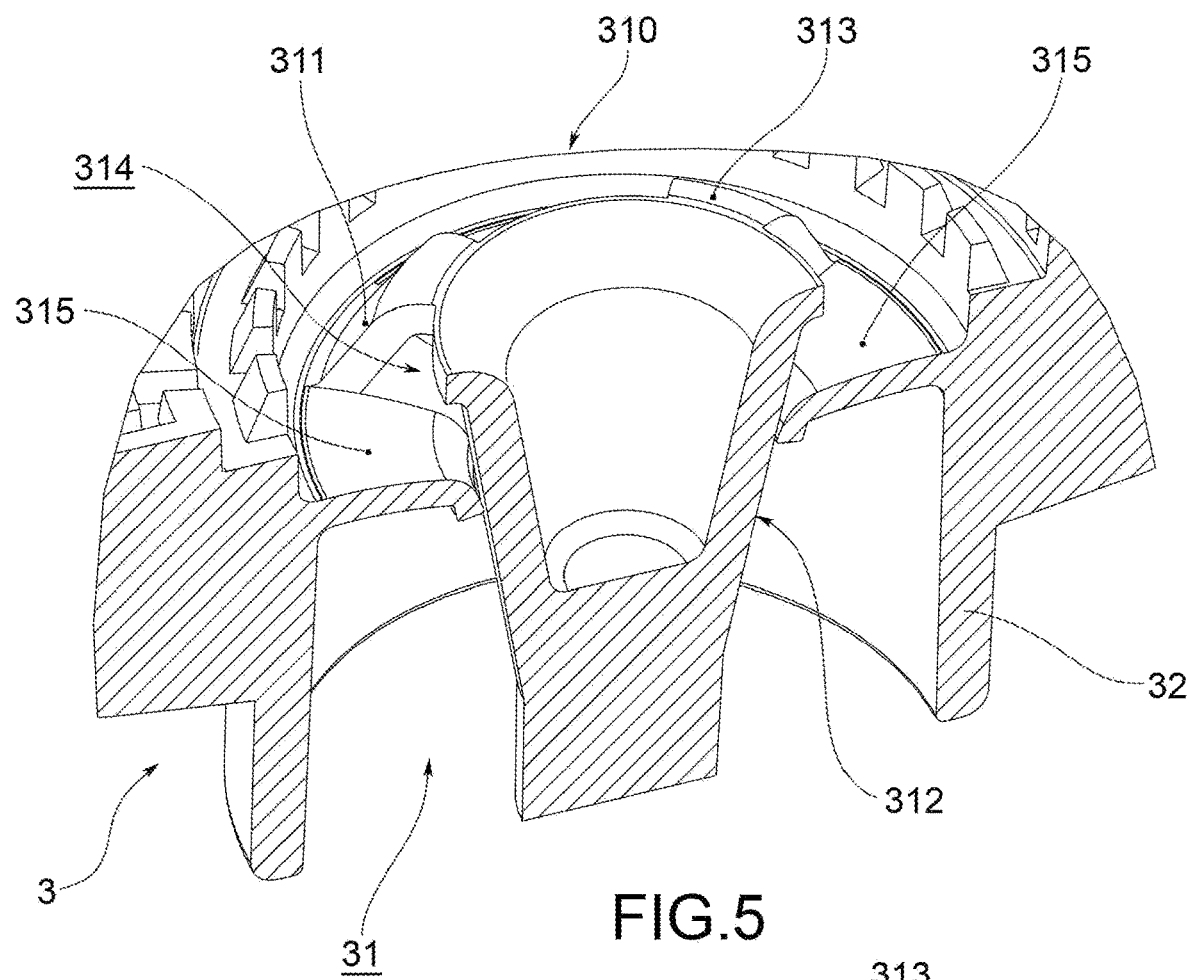
FIGS. 5 and 6 show a detail of the cup in FIG. 4, in particular the inner separation wall with the outlet nozzle at a later stage of production, i.e. equipped with openings for the beverage to flow out.
Figure 9:
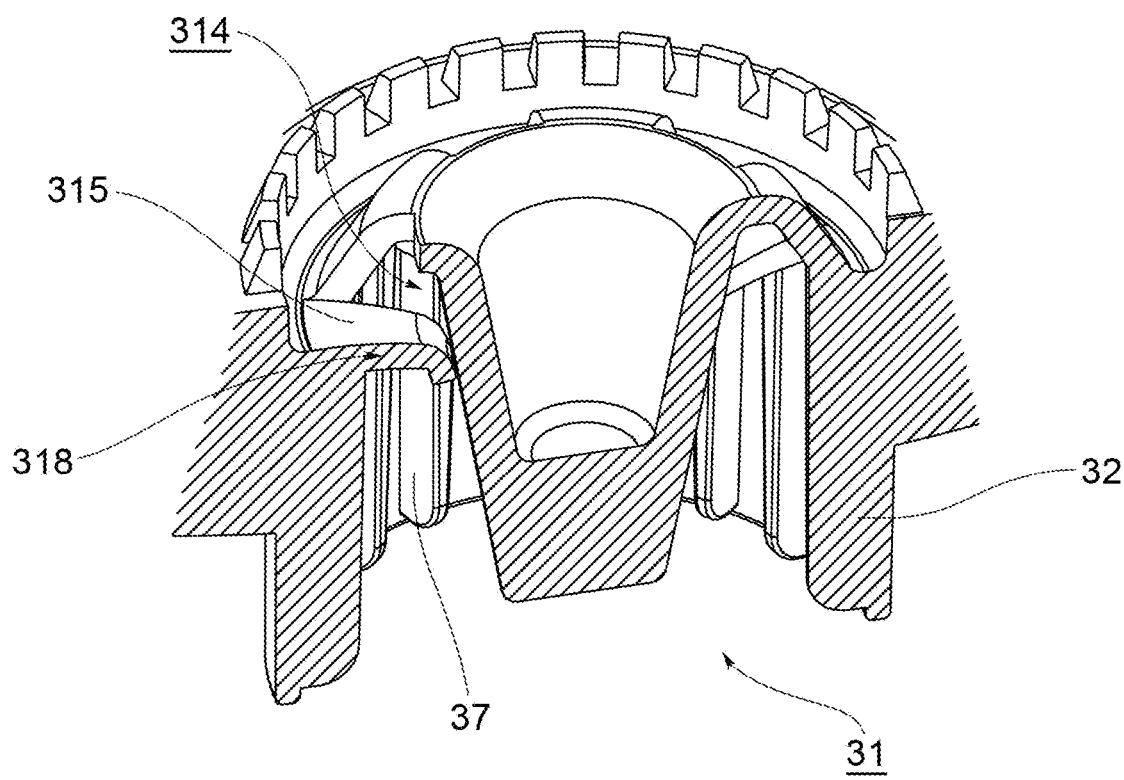
FIGS. 9 and 10 show the capsule of FIG. 4, further equipped with a flow deflector system at the outlet nozzle.
Figure 10:
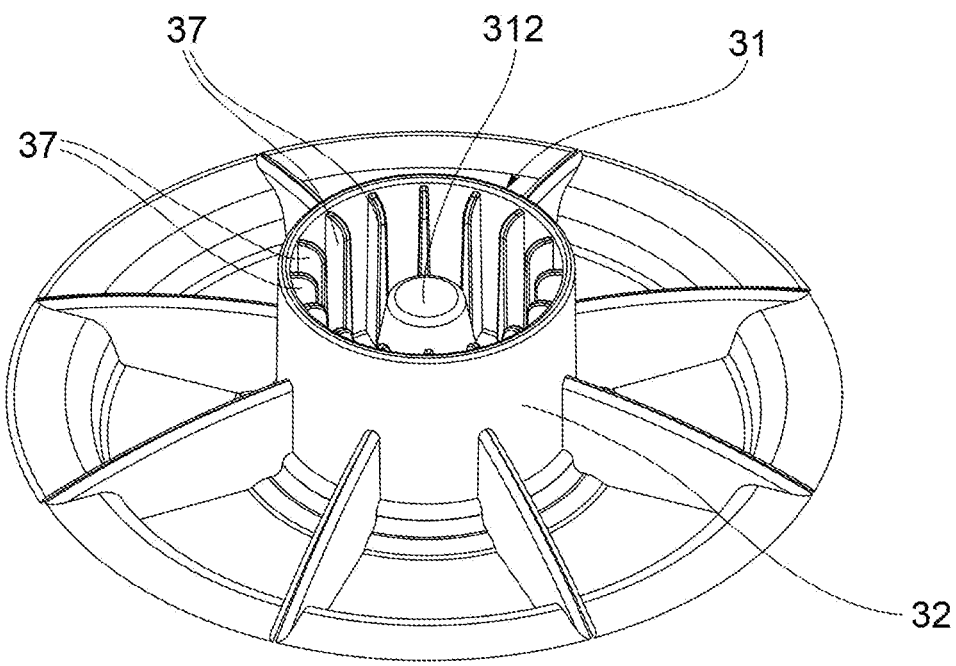

In the variant embodiment of FIGS. 5 and 9, the shearing is carried out without removing any material. More specifically, the shearing step provides for a first cutting step of the central portion 310 and a subsequent folding step of the central portion 310. Preferably, the first cutting step provides for cutting a plurality of portions (segments) in the external circular crown 311 to form a plurality of fins 315 connected only to the inner base 33. The next folding step provides for folding the fins 315, still connected to the rest of the inner base 33, towards the inside of the nozzle 32. Such folding step of the fins 315 allows a plurality of connection openings 314 to be made between the inside of the cup 2 and the outlet opening 31, to allow the infused beverage to flow out of the capsule 1. Advantageously, moreover, the fins 315 (bent horizontally towards the inside of the nozzle) create a deflector 318, i.e. a substantially horizontal barrier that prevents the infused beverage from falling directly into the nozzle 32.

Figure 6:
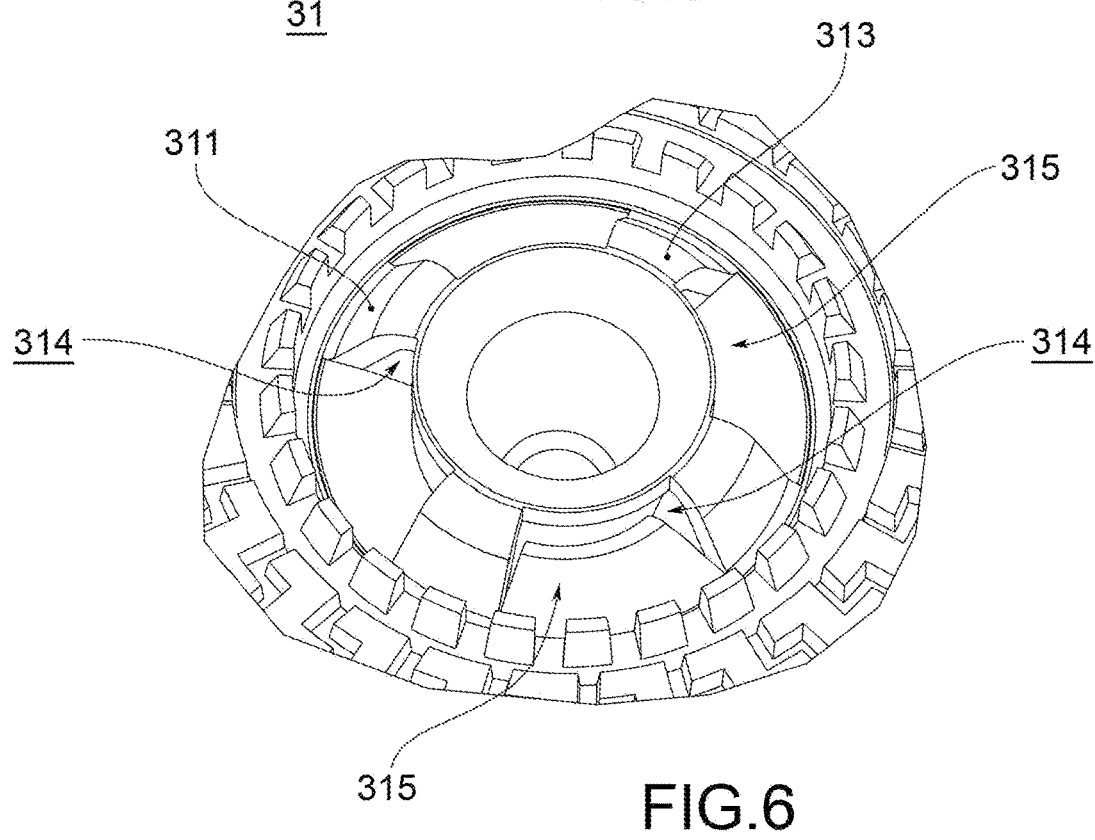

As seen from FIG. 6, the openings 314 are substantially transverse to the inner base 33 (i.e. they do not extend in the plane of the inner base 33 but rather extend in a plane transverse to the plane of the inner base 33): this entails a tortuous path for the beverage towards the nozzle. In other words, the beverage flows along the plane of the inner base 33 in a radial direction towards the central portion 310; at the fin 315, the beverage arrives in abutment against an upper portion of the central pin 312, undergoes a change of direction (from radial to circumferential) and flows through the openings 314 towards the nozzle. Such tortuous path significantly reduces splashing when the beverage exits the opening 31.

In such variant embodiment, moreover, in order to achieve a continuous and regular flow of the beverage leaving the nozzle 32, the inner wall of the nozzle is equipped with a plurality of vertical fins 37, arranged uniformly in a circumferential direction, adapted to convey the flow of the infused beverage towards the outlet opening 31.

Figure 12:
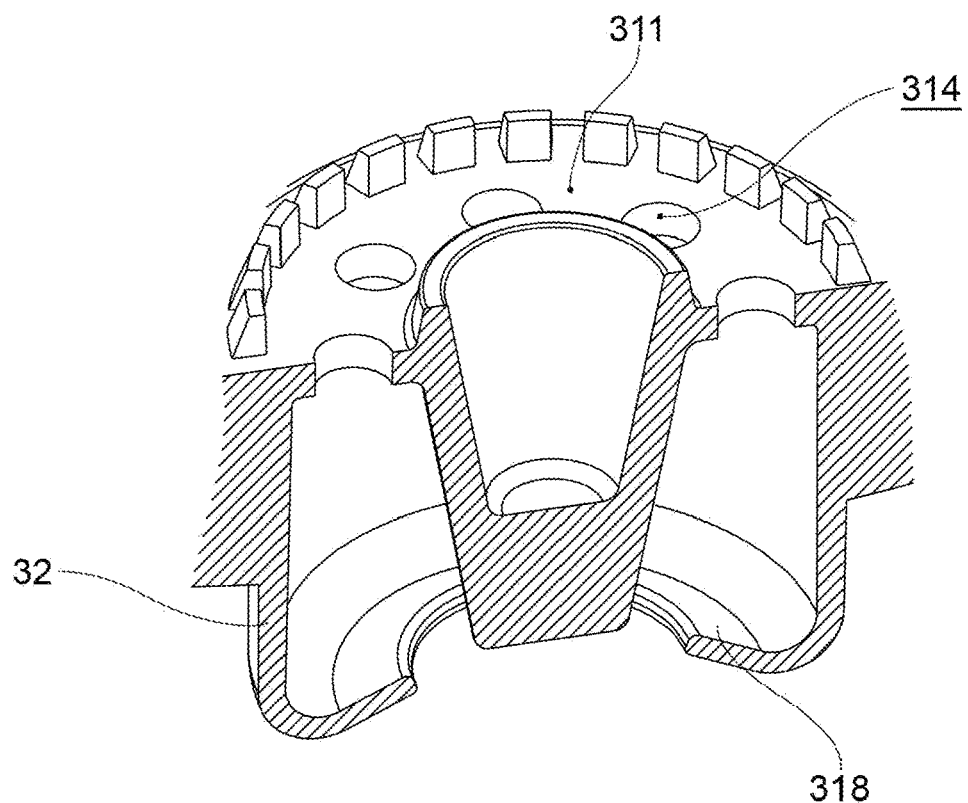
Figure 14:
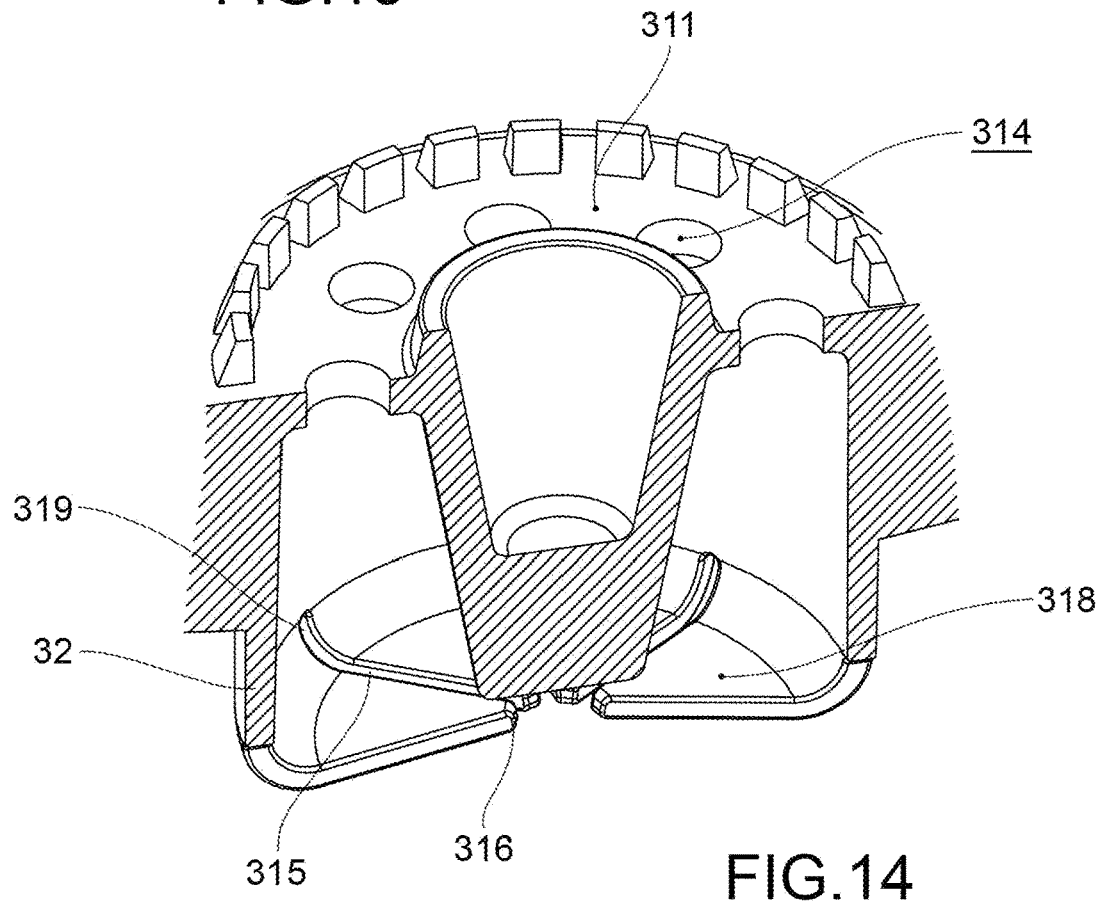

In the variant embodiment of FIGS. 12 and 14, the shearing step provides for cutting or perforating the outer circular crown 311 to form a plurality of openings 314 connecting the inside of the cup 2 and the outlet opening 31 to allow the infused beverage to flow toward the outside of the capsule 1.

Also in such variant embodiments (FIGS. 12 and 14), in order to reduce splashes when the beverage flows out of the opening 31, the capsule is equipped with a deflector 318. In particular, a folding step is provided for the end edge 317 of the nozzle 32 towards the inside of the opening 31. Such folding allows a tortuous path to be made for the beverage towards the exit of the capsule: the beverage flows through the openings 314 towards and inside the nozzle 32 in the vertical direction; the beverage arrives in abutment against the deflector 318 and undergoes a change of direction (from vertical to horizontal) and then flows through the outlet opening 31. Such tortuous path reduces considerably the splashing of the beverage when it exits the opening 31; moreover, the opening 31 has, after the step of folding and forming the deflector, a smaller diameter, which allows for a continuous and regular flow of the beverage when it exits.

Figure 11:
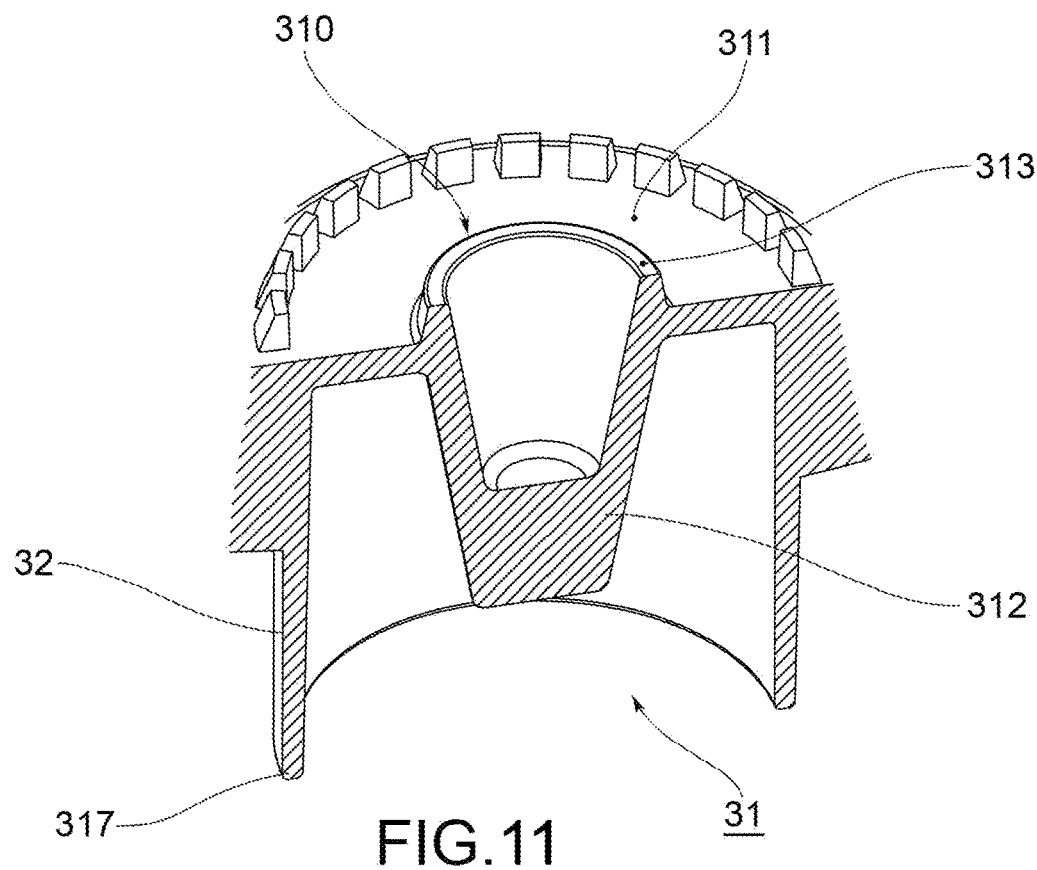
FIGS. 11 and 12 show a further variant embodiment of the capsule according to the present invention, in particular an internal separation wall with the outlet nozzle in a first stage of production, i.e. completely closed (FIG. 11) and in a subsequent stage of production, i.e. equipped with openings for the outflow of the beverage (FIG. 12) and further equipped with a flow deflector system at the outlet nozzle.

In the variant embodiment of FIG. 11, the end edge 317 of the nozzle 32 is a continuous circle, and, in the step of folding towards the inside of the opening 31, a deflector 318 is obtained in the form of a continuous circular ring, as shown in FIG. 12.

Figure 13:
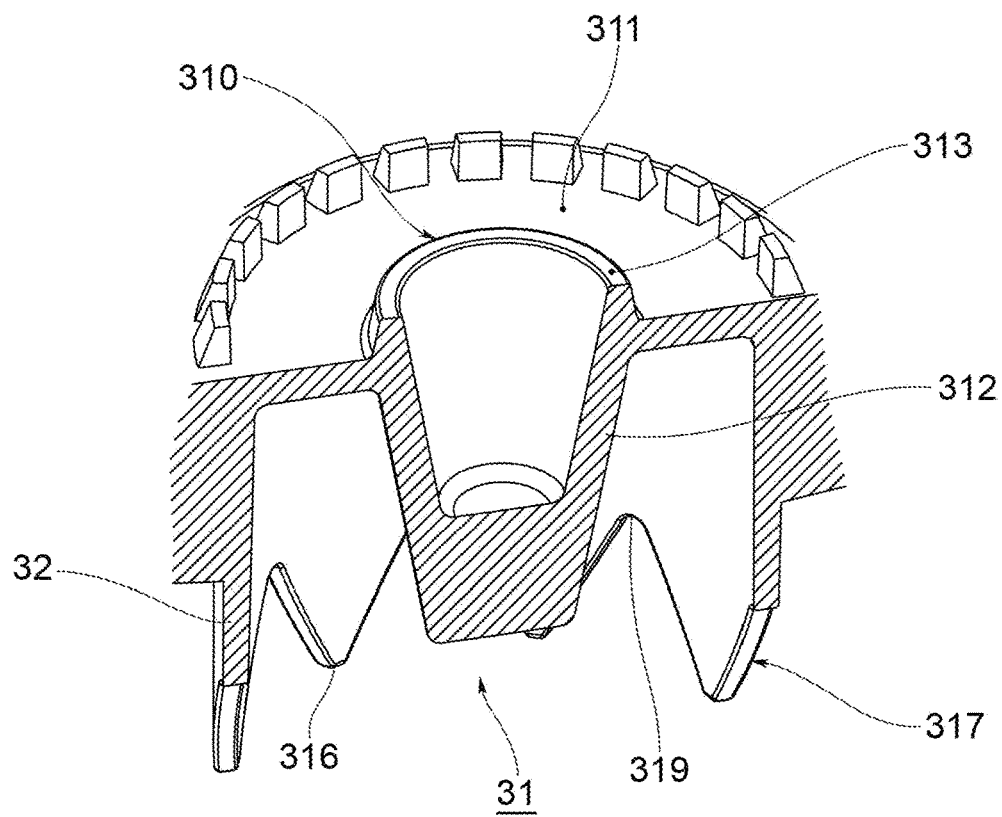
FIGS. 13 and 14 show a variant embodiment of the capsule of FIGS. 11 and 12, equipped with a flow deflector system at the outlet nozzle.

In the variant embodiment of FIG. 13, the end edge 317 of the nozzle 32 is circular and wavy, i.e. equipped with a sequence of peaks 316 and valleys 319. During the folding step, the peaks 316 are folded to the inside of the opening 31, creating a deflector 318 in the form of a circular ring equipped with grooves 315.

Preferably, moreover, the base 33 comprises a labyrinth 30 adapted to hinder, by capillarity, the passage of the infused beverage towards the nozzle 32 when the pressure inside the capsule 1 drops below a threshold value, or ceases altogether when the capsule 1 is disengaged from the infuser group of the machine.

The base 33 comprises, moreover, an outer edge 360, defined by another protuberance, whereon a sealing disc 5 may be fastened.

Thus, in summary, the production method of a cup 2 according to the present invention comprises the steps of:
  co-injection molding of a cup 2 made of multilayer plastic material with an outer layer, an inner layer and an intermediate layer of the gas barrier type; said cup 2 being a single body provided with an inlet opening 21 and, on the opposite side, a bottom 3 provided with a nozzle 32; said cup 2 having an inner base 33 comprising a completely closed central portion 310 covering the nozzle 32;
  partial shearing of the central part 310 to create a plurality of connection openings 314 between the inside of the cup 2 and the nozzle 32.

In one variant embodiment, the cutting step of the central portion 310 provides for cutting the central portion 310 to form a plurality of fins 315, which remain connected to the inner base 33; such variant also provides for a subsequent folding step of the fins 315 towards the inside of the nozzle 32 to form a deflector 318.

In a further variant embodiment, the cutting step of the central portion 310 provides for cutting said central part 310 to form a plurality of through-holes 314; preferably, such variant also provides for a subsequent folding step of the end edge 317 of the nozzle 32 towards the inside of the nozzle 32 to form a deflector 318.

FIG. 4 shows the cup 2 at the end of the production stage, i.e. wherein the central portion 310 is provided with a plurality of openings 314 connecting the inside of the cup 2 to the outlet opening 31. Such cup 2 is usable to make a capsule 1 for the preparation of an infused or soluble beverage, shown, for example, in FIGS. 7 and 8.

The capsule 1 comprises a lid 6 fastened by bonding or welding to the upper edge 4 adapted to seal the cup 2 at the top.

The capsule 1 is therefore provided internally with a sealing disk 5 located at the base 33 and adapted to seal the cup 2 on the bottom. The capsule 1 is thus provided with a closed chamber, defined at the top by the lid 6 and at the bottom by the disc 5, within which the substance 11 to be infused or dissolved is contained. The presence of a hermetically sealed chamber is important for properly maintaining and preserving the substance 11.

Figure 7:
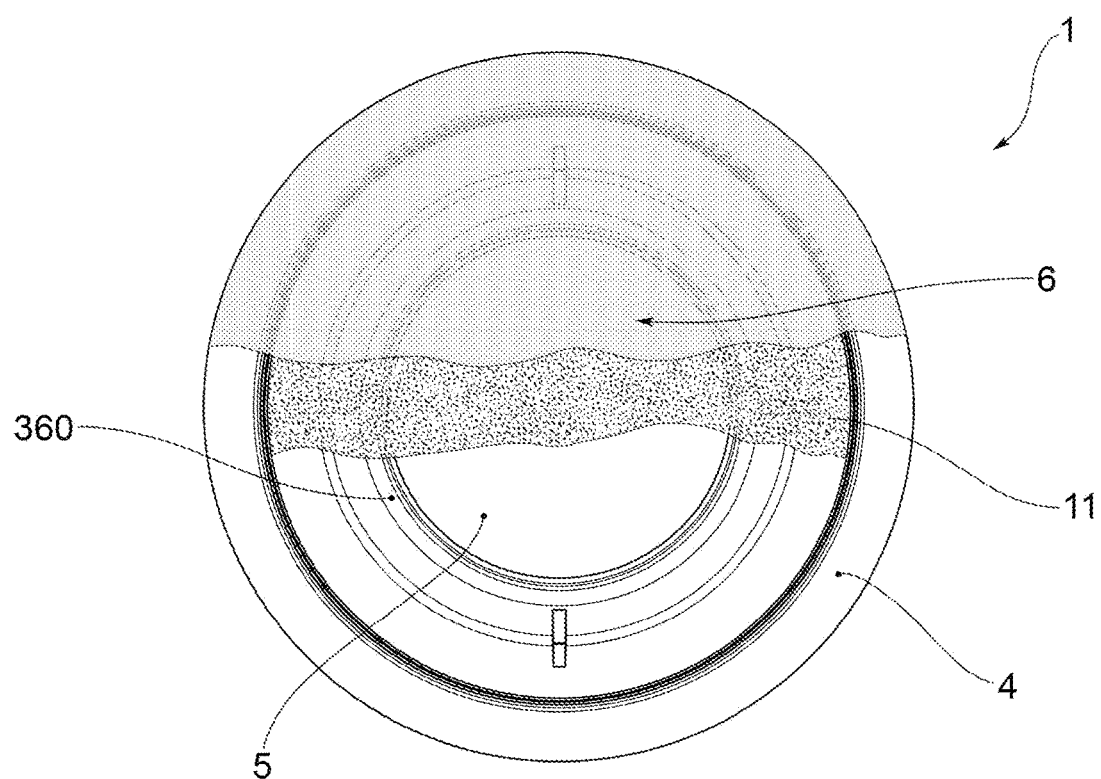
FIGS. 7 and 8 show an example of the use of the cup according to the present invention, for making a capsule equipped with an inner sealing disc adapted to close the chamber containing the food substance to be infused (FIG. 7) and to open said chamber through the increase in the pressure of the injection fluid in the same chamber, thus allowing the beverage to escape (FIG. 8)
Figure 8:
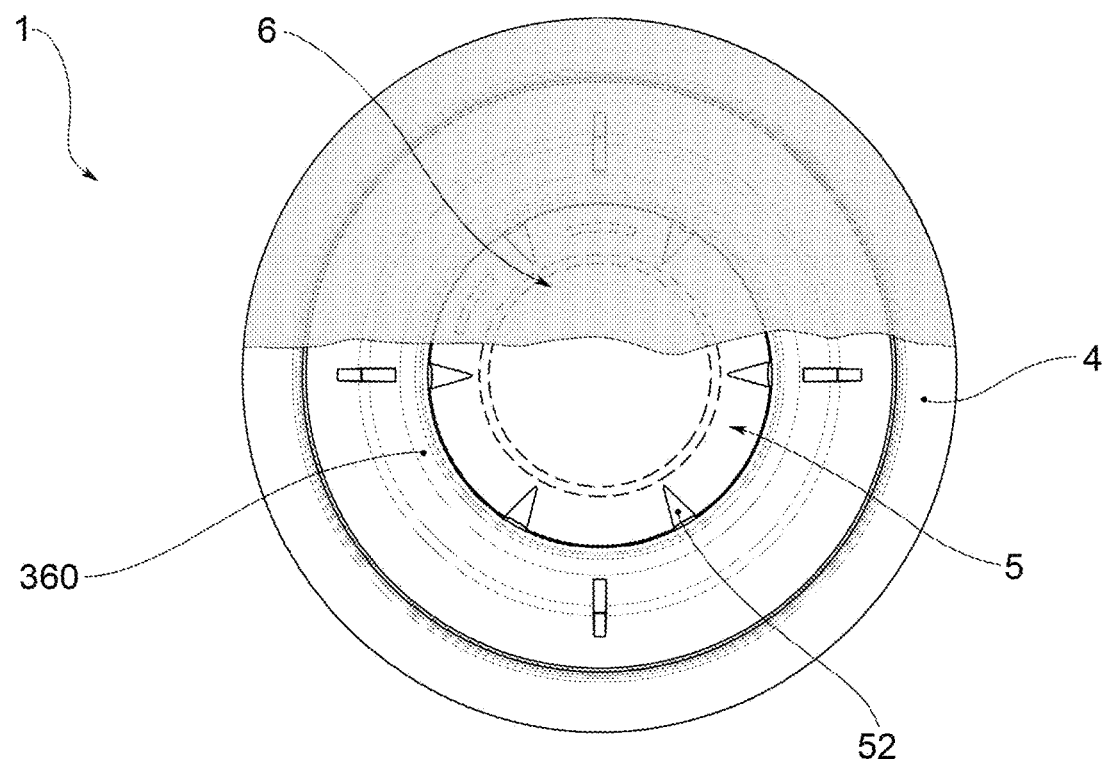

As shown in FIGS. 7 and 8, the disc 5 is positioned below the substance 11 and above the base 33.

Preferably, the disc 5 is made of plastic, multilayer or single layer, or of a plastic/aluminum composite material.

The disc 5 is fixed internally to the cup 2, at the base 33, at least on the top surface of the edge 360 and the central portion 310, i.e. the flat portion 313.

In particular, the disc 5 is welded using a thermo-active material (a lacquer, a glue, a polymeric lower layer in the case of a multilayer disc) with a low adhesion level, so as to allow its detachment or separation from the base 33, and in particular from the edge 360, as a result of the increase in temperature and pressure inside the capsule 1.

The capsule 1 may be made in different versions, for example, for the preparation of infused beverages (for example coffee) or soluble beverages.

Preferably, the coffee capsule 1 comprises a filter fastened under the substance 11 on the inner walls of the cup 2 and just above the disk 5. The presence of the filter, preferably in paper or fabric or non-woven fabric, allows the infused liquid to be filtered before it exits the capsule 1.

Preferably, the capsule 1 for coffee also includes a permeable or micro-perforated film, fastened at a certain distance above the substance 11, on special horizontal abutments provided inside the cup 2. The presence of such film, which allows the passage of the fluid under pressure but not the passage of the substance 11, prevents the dispersion of coffee powder during infusion, improving the quality of the infused beverage.

In the case of a capsule for the preparation of soluble drinks, such as chocolate or milk, the capsule 1 comprises the lid 6 and the sealing disc 5 and is devoid of a filter and permeable or micro-perforated film.

The capsule 1, in its diverse variant embodiments, may be used for the impromptu preparation of beverages (such as tea, coffee, herbal teas, milk, chocolate, etc.) by means of automatic or semi-automatic machines equipped with a dispensing group adapted to produce an infusion via the passage of pressurized hot water through the capsule 1.

In use, therefore, the capsule 1 (FIG. 7) is inserted in a special seat (called the infusion chamber) provided in the machine. The machine perforates the lid 6, positioned to close the capsule 1, and injects a pressurized fluid (typically hot water) into the chamber wherein the substance 11 is contained.

The presence of the disc 5 to seal the bottom 3 of the capsule 1 allows the pressurized fluid to remain for a certain amount of time in contact with the substance 11 to be infused or dissolved in order to ensure that an optimal infused beverage is obtained. The pressure exerted by the fluid inside the capsule 1 rises to the opening pressure (for example between 4 and 8 bar) which pushes on the disc 5 to cause the capsule 1 to open. In particular, as shown in FIG. 8, the opening of the capsule 1 is caused by the at least partial detachment of the disc 5 from the edge 360. Such detachment causes the sealing effect, previously ensured by the sealing disc 5, to fail.

Again, due to the pressure increase inside the capsule 1, the disc 5 deforms with a certain waviness and forms at least one wrinkle 52, preferably a plurality of wrinkles 52, so as to allow the opening of a passage for the infused liquid to escape.

Preferably, the capsule 1 according to the present invention is provided, at the base 33, with supports 90 adapted to accompany the deformation of the disk 5 in such a way that it does not tear or break.

Advantageously, the supports 90 have rounded and beveled profiles and are therefore free of sharp edges or sharp profiles.

A capsule according to the present invention may be used for the packaging of concentrated products (in the form of powder or granules or leaves) in predetermined, single-use doses, for the impromptu preparation of beverages such as leaf or soluble tea, powdered or instant coffee, herbal teas, milk, chocolate, or other dehydrated and soluble products.

Innovatively, a method according to the present invention allows a cup for the production of capsules for infused and soluble beverages to be obtained, which is barriered and at the same time safe to one's health, and which allows the complex and articulated geometries necessary for an optimal dispensing of the beverage to be obtained.

Advantageously, a cup according to the present invention is provided with a deflector 318 (whether made by folding the fins 315 and therefore at the central portion 310 of the inner base 33, or by folding the end edge 317 of the nozzle 32 and therefore at the outlet opening 31), which creates a horizontal barrier against the direct fall of the infused beverage towards the outlet of the capsule.

Advantageously, the particular configuration of the central portion 310 and the nozzle forces the exiting beverage to change direction in order to obtain a continuous and regular flow thereof.

It is clear that a person skilled in the art may make modifications to the cup for a capsule for the preparation of infused or soluble beverages described above, all of which are within the scope of protection as defined by the following claims.

What is claimed is:

1. A method for producing a cup for a capsule for the preparation of infused or soluble beverages, the method comprising the steps of:
   co-injection molding a cup of multilayer plastic material with an outer layer, an inner layer, and an intermediate layer of a gas barrier type, the cup being a single body provided with an inlet opening and, on an opposite side, with a bottom provided with a nozzle, the cup having an inner base comprising a completely closed central portion covering the nozzle;
   partially cutting the central portion to form at least one opening connecting the inside of the cup and the nozzle; and
   folding a portion of the cup between the at least one opening and the nozzle towards the inside of the nozzle to form a deflector, the deflector including a substantially horizontal floor.

2. The method of claim 1, wherein the cutting step involves forming a plurality of fins that remain connected to the inner base, and the folding step includes folding the plurality of fins towards the inside of the nozzle.

3. The method of claim 1, wherein the cutting step involves forming a plurality of through holes, and the folding step includes folding an end edge of the nozzle toward the inside of the nozzle.

4. The method of claim 1, wherein the intermediate layer is made of ethylene vinyl alcohol (EVOH) or polyvinyl alcohol (PVOH).

5. The method of claim 1, wherein the outer layer and the inner layer are made of polypropylene (PP), polyethylene (PE), or polylactic acid (PLA).

* * * * *